United States Patent
Villalobos et al.

(10) Patent No.: US 7,611,661 B1
(45) Date of Patent: Nov. 3, 2009

(54) SPINEL AND PROCESS FOR MAKING SAME

(75) Inventors: Guillermo R. Villalobos, Springfield, VA (US); Jas S. Sanghera, Ashburn, VA (US); Shyam S. Bayya, Ashburn, VA (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 593 days.

(21) Appl. No.: 11/094,543

(22) Filed: Mar. 24, 2005

Related U.S. Application Data

(62) Division of application No. 10/601,884, filed on Jun. 24, 2003, now abandoned.

(51) Int. Cl.
*C04B 35/10* (2006.01)
(52) U.S. Cl. .................................. 264/681; 264/910
(58) Field of Classification Search ................. 264/681, 264/910; 501/153
See application file for complete search history.

(56) References Cited

U.S. PATENT DOCUMENTS

| | | | |
|---|---|---|---|
| 3,768,990 A | | 10/1973 | Sellers et al. |
| 5,628,945 A | * | 5/1997 | Riman et al. ................. 264/117 |
| 6,464,906 B1 | * | 10/2002 | Niwa et al. .................... 264/7 |

* cited by examiner

*Primary Examiner*—Carlos Lopez
(74) *Attorney, Agent, or Firm*—John J. Karasek; Suresh Koshy

(57) ABSTRACT

This invention pertains to product and process. The product is a transparent product of a density in excess 99.5% comprising spinel and having uniform mechanical properties. The process pertains to fabrication of a transparent spinel product comprising the steps of dissolving a sintering aid in water to form a neutral sintering aid solution, adding a suitable additive to the sintering aid solution, applying the sintering aid solution to spinel particles to form a spinel dispersion, subdividing or atomizing the spinel dispersion to form droplets comprising one or more spinel particles coated with the final spinel solution, drying the droplets to form dried coated particles comprising one or more spinel particles coated with a dried layer of the sintering aid, and densifying the dried coated particles to form a transparent spinel product having, uniform optical and mechanical properties in absence of grains of exaggerated size.

2 Claims, 4 Drawing Sheets

1" DIAMETER BY~ 1 mm THICKNESS

|  | Mg - SPINEL | GLASS |
| --- | --- | --- |
| DENSITY (g/cm$^3$) | 3.58 | 2.51 |
| ELASTIC MODULUS (GPa) | 277 | 82 |
| FLEXURE STRENGTH (MPa) | 241 | 70 |
| FRACTURE TOUGHNESS (MPa m$^{1/2}$) | 1.7 | 1 |
| HARDNESS (Kg/cm$^2$) | 1210 | 610 |
| TRANSMISSION RANGE (μm) | 0.3-5.5 | 0.3-2 |

*FIG. 5*

SPINEL AND PROCESS FOR MAKING SAME

This Application is a divisional of application Ser. No. 10/601,884, filed Jun. 24, 2003, now abandoned.

BACKGROUND OF THE INVENTION

1. Field of the Invention

This invention pertains to the field of sintered ceramics, particularly magnesium aluminum spinel, and to a process for preparing sintered ceramic articles from ceramic powders.

2. Description of Related Art

Sintering is defined as the act of consolidating powder into a dense shape. The powder being sintered must additionally not melt to a great extent, some melting of secondary phases in the powder, or surface melting is allowed under this definition. If the material completely melts, the process is referred to as fusion casting. Sintering, both presureless and with pressure, or hot pressing, requires solid, liquid or gas material transport to consolidate an aggregate of loose powder particles into a dense shape. In the case of porcelains and clay products, secondary phases do melt and "glue" the primary solid particles together with a glassy phase. These types of systems were the first to be used due to their ease of sintering. However, advanced ceramics do not have these intrinsic sintering aids and they must therefore, be added. For small samples, the powdered sintering aids are mixed with the powder to be sintered with a mortar and pestle. In larger samples, mixing is accomplished by ball milling, attritor milling, high shear wet milling, and variations or combinations of these methods.

Spinel is defined as a crystalline structure of the type $AB_2O_4$ where A is a 2+ cation occupying tetrahedral lattice site in an oxygen cubic close packed structure and B is a 3+ cation occupying octahedral lettice site. In a preferred embodiment, spinel is $MgAl_2O_4$ consisting of an oxide of magnesium and aluminum. Spinel powder can be prepared by wet chemistry, solid state diffusion of oxides or calcination. Spinel powder particles consist of crystallites which are less than 500 nm in size that can also be agglomerated into larger sizes varying from 500 nm to 100 μm, more typically 1-50 μm.

Spinel is important because it is strong and transparent from visible to 5.5 μm wavelength. Its mechanical properties are several times greater than that of glass and make it a leading candidate for use as a transparent armor and window material. Commercially, it can be used as a stronger and thinner window for many applications including lap top computers, cell phones, automotive glassing and headlamps, aerospace windshields, and industrial blast shields.

Dense, transparent spinel articles are not currently available from a commercial source although there are companies currently trying to develop a viable manufacturing process. Since there is no viable manufacturing process, the cost of spinel products is so high that even the military avoids its use.

Difficult to sinter materials, such as spinel, are typically mixed with a sintering aid or a secondary material that aids in densification. The sintering aids work in a variety of fashions. The sintering aids may liquefy at or somewhat below the primary material's densification temperature thereby promoting liquid phase sintering. Certain sintering aid materials exhibit higher solid-state diffusion coefficients than the primary material's self-diffusion coefficient. The secondary material may conversely have a lower solid-state diffusion coefficient that prevents exaggerated grain growth and promotes grain boundary refinement and pinning. The sintering aid may also simply clean or etch the primary material's surfaces thereby enhancing solid-state diffusion. These are broad examples of the mechanisms by which sintering aids enhance densification. In actual practice, sintering aids may not fit into just one of the categories outlined and the same aid may have different functions in different material systems, or have no effect in other systems.

Sintering aids tend to be solid inorganic particles at room temperature. Sintering aid particles henceforth are defined as comprising crystallites ($\leqq$500 nm), crystals (>500 nm), and agglomerates of crystallites and/or crystals. Since the materials to be densified are generally also solid inorganic particles, the two materials must be mixed homogeneously for the sintering aid to be effective. This is accomplished by some form of mechanical mixing. However, due to the nature of particle-particle interactions, the mixture is far from homogeneous. Inhomogeneity in the mixture results in areas that have too much sintering aid and other areas that have little or no sintering aid. This is a major problem in the fabrication of transparent ceramics, electronic ceramics, and in high tech refractory ceramics.

The Sellers et al U.S. Pat. No. 3,768,990 discloses an optical element having transparency in the visible and infrared wave lengths that is made by heating at an elevated temperature a composition having sub-micron particle size of magnesium oxide and aluminum oxide having uniformly mixed therethrough 0.2-4% by weight of powdered LiF. It is believed that optical and mechanical properties of the Seller's optical element are negatively impacted by the inhomogeneous presence of substantial amount of LiF. This leads to microstructural regions that are highly porous and other microstructural regions that exhibit exaggerated grain growth, all of which lead to inferior optical and mechanical properties. This has prevented the use of spinel in practical applications since the Seller's patent issued in 1973. Furthermore, it is believed that the atomic concentrations of lithium and fluorine will be greater than about 1000 ppm and 100 ppm, respectively due to the fact that LiF is well known to react with alumina, which Seller's uses as a starting powder.

OBJECTS AND BRIEF SUMMARY OF THE INVENTION

It is an object of this invention to make spinel products or products that contain spinel that are moderately priced.

It is another object of this invention to increase transmission of spinel products from about 5% at 0.525 μm, which is relatively opaque, to at least 50% at 0.525 μm, which is transparent.

It is another object of this invention to eliminate or reduce the Hot Isostatic Pressing (HIP) procedure in the fabrication of the spinel products.

Another object of this invention is the more uniform distribution of the sintering aid on the spinel particles.

Another object of this invention is to increase densification of sintered spinel products beyond 99.8%.

Another object of this invention is the more complete and more uniform covering on surfaces of the spinel particles by a sintering aid which is achieved by dissolving the sintering aid in a solvent to create a sintering aid solution and then adding the spinel particles in the sintering aid solution to form a dispersion, also referred to as a ceramic dispersion.

These and other objects of this invention can be achieved by a transparent spinel product that is fabricated by sintering and densifying spinel powder in absence of the HIP procedure by dissolving a sintering aid in a solvent to form a sintering aid solution, adding spinel particles in the sintering aid solution to form a dispersion, maintaining the dispersion in a state which discourages precipitation of the solid sintering aid, spray-drying the dispersion to form spinel particles coated with a sintering aid, and densifying the coated spinel particles to form a transparent product.

BRIEF DESCRIPTION OF THE DRAWINGS

FIG. 5 is a table showing relative parameters of spinel ($MgAl_2O_4$) and glass;

DETAILED DESCRIPTION OF THE INVENTION

Figure 1:
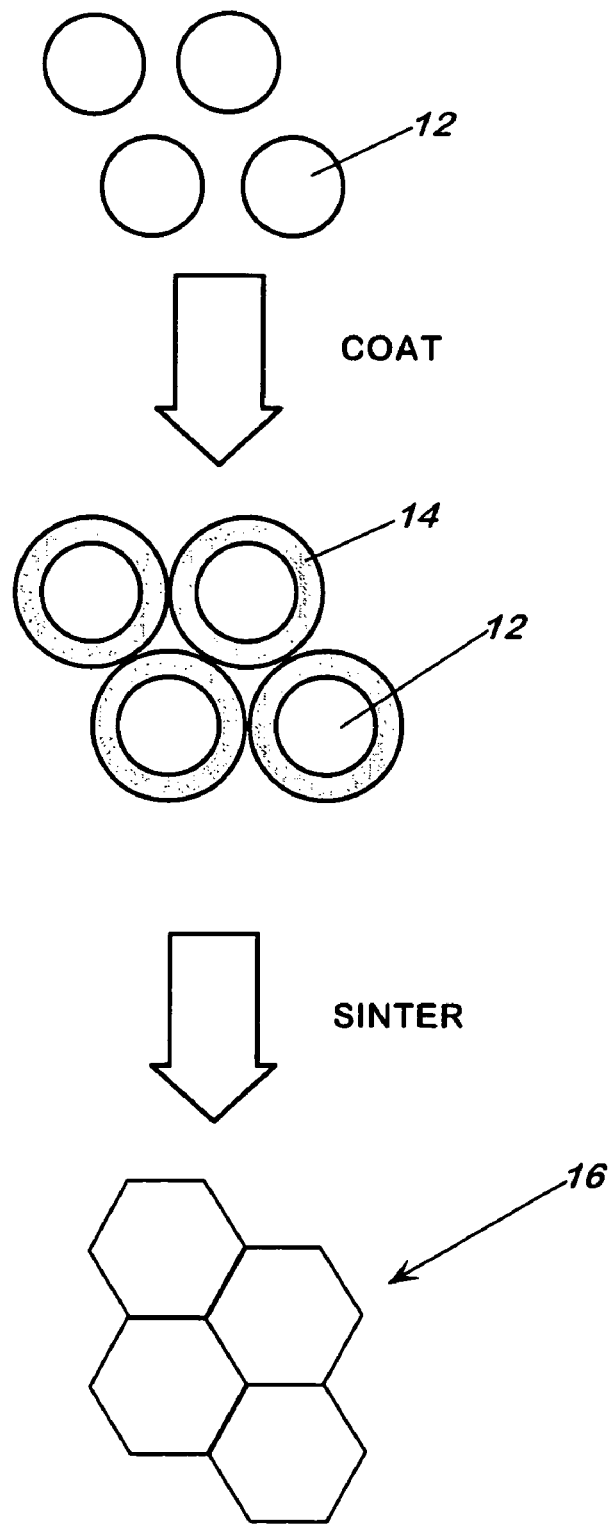
FIG. 1 is a schematic illustration of the process of coating spinel particles with LiF sintering aid and formation of the final densified $MgAl_2O_4$ product.

This invention pertains to a sintered and transparent spinel product and to a process for making it which is characterized by spraying a dispersion consisting of spinel particles in a sintering aid solution to form spinel particles coated with the sintering aid. The sintering aid coating on the spinel particles need not be continuous, although it should be sufficient to prevent a large number of sites where the particles contact each other without an intervening layer of a sintering aid.

The sintered and densified spinel product of this invention is novel and unobvious when compared to prior art. Preparation of a spinel product by prior art procedure yields a product that is not transparent but opaque afrer hot pressing and requires extended HIPing to render the product transparent, however, with consequent loss of optical and mechanical properties. To explain more fully, the prior art product can be made transparent by extending the HIPing procedure beyond the customary period of on the order of a day, however, prolonging the hot processing and/or the HIPing procedure introduces exaggerated grain growth which renders the resulting product non-uniform in terms of optical and mechanical properties such as elastic modulus, flexure strength and fracture toughness, properties which are paramount for spinel character. The novel and unobvious product, made in absence of the HIP procedure, as described herein, is transparent over the wavelength range of about 0.3-5.5 µm, has uniform optical and mechanical properties and its grains are smaller than about 1 mm, typically smaller than about 500 µm. The spinel product of this invention does not have the exaggerated grain growth or is essentially devoid of grains of exaggerated size. There are no grains larger than about 1 mm. Exaggerated grain growth typically leads to grains that are greater than 3 times larger to several orders of magnitude larger than an average sized grain. Transparency of the spinel product of this invention, made in the manner disclosed herein and in absence of the HIP procedure, is above about 50% and up to about 90%.

In the preparation of the sintered spinel product of this invention, the sintering aid, such as LiF or any other suitable sintering aid such as NaCl, NaF, LiCl, etc., is dissolved in a suitable solvent, typically water, to form a sintering aid solution. The sintering aid can be in any condition, however, it is typically particulate with particle sizes in the range of 500 nm-10 µm. This, of course, is not important because the sintering aid is eventually dissolved to form a sintering aid solution. To enhance spraying of the sintering aid solution, ethanol or isopropanol or another suitable diluent is admixed with the aqueous sintering aid solution to form a modified sintering solution, which henceforth is referred as the sintering aid solution. Aqueous solution of LiF by itself is not readily sprayable using an ultrasonic atomizer in absence of a low surface tension/viscosity liquid component, which is typically a suitable additive, such as an alcohol. The overriding consideration in adding another component to water is to enhance solubility of the sintering aid and the sprayability of the modified sintering aid solution. If the sintering aid is other than LiF, other component(s) known to a person skilled in the art may be used. A typical sintering aid solution is prepared by admixing 0.2 g LiF sintering aid, 220 ml water, and 780 ml ethanol or another like component. Typically, the ratio of the components is on this order of magnitude. The sintering aid solution should not contain too much sintering aid, such as about in excess of about 10% by weight.

Coating of the spinel particles can be effected in any desired manner in order to deposit a uniform layer of the sintering aid on the particles. The sintering aid coating can be applied onto the spinel particles in any suitable manner such as in a fluidized bed, by a wet chemistry technique, by CVD, plasma enhanced CVD, laser assisted deposition, by sputtering, by an evaporation technique, and the like. The coating need not be continuous, but should be sufficient to prevent a large number of sites where the particles contact each other without an intervening layer of a sintering aid material. Spraying of the final sintering aid solution can also be used to deposit at least a monolayer of the sintering aid on the spinel particles. Another way of accomplishing this objective is simply to immerse the spinel particles in the final sintering aid solution until the spinel particles acquire a coating of the sintering aid of sufficient thickness and sufficient uniformity.

The sintering aid solution is maintained in a state where it is on the spinel particles and the sintering aid is in solution and not precipitated on the spinel particles. This may require adjustment of temperature, pH, and/or another parameter(s) to discourage precipitation of the sintering aid on the particle surface. If the sintering aid is LiF, precipitation thereof can be discouraged or prevented by maintaining a neutral pH of about 7 of the sintering aid solution.

The spinel particles are typically in the range of 500 nm to 100 µm and amount of the sintering aid on the spinel particles is typically 0.05-10% on weight basis, more typically 0.1-2% by weight of the spinel particles. FIG. 1 is illustrative of the coating process and shows spinel particles 12 coated with sintering aid 14, sintered to produce product 16. Spinel particles must be insoluble in mixtures of water and the additives used.

The dispersion resulting when spinel particles are mixed with the sintering aid solution is delivered to an atomizer where the dispersion is sprayed, causing sub-division into droplets which are transported into a drying zone where vaporizable matter is removed from the droplets and the solid coating is formed thereon. The droplet size can be up to 1000 µm but is typically up to 500 µm, more typically 5 nm to 250 µm, and especially 50 nm to 50 µm. Any suitable atomizer can be used, including mechanical, piezoelectric (ultrasonic) and electrostatic, as long as droplets containing the desired number of spinel particles are formed and the preponderance of resulting coated droplets are completely or hermetically sealed or coated.

Whatever atomizer is used, chemistry of the dispersion should be such as to prevent premature precipitation of the coating on the spinel particles, and the droplets issuing from the atomizer should contain at least one of the spinel particles per droplet. Typically, an ultrasonic atomizer is used at a variable frequency since size of a droplet can be controlled by varying atomizer frequency. For instance, at atomizer frequency of 20 kHz, droplets of about 90 μm can be formed; at frequency of 40 kHz, droplets of about 45 μm can be formed; and at 80 kHz, droplets of about 20 μm can be formed. As is apparent, the inverse relationship between atomizer frequency and the droplet size can be used to control the droplet size.

The higher the temperature in the drying zone, the shorter residence time is required of the droplets in the zone to have the vaporizable matter removed from and the coating formed thereon. The temperature in the zone should be high enough to drive-off volatile matter from the particles but not so high as to impart thermal damage to the particles or the coating. Furthermore, temperature in the zone should be high enough to drive-off volatiles from the droplets in a reasonable or desired time, which can be adjusted by changing temperature in the zone, with higher temperature in the zone reducing residence time of the droplets to form dry, coated particles. Typically, depending on many factors, temperature in the drying zone should be in excess of about 100° C. and below 600° C., more typically 200° C.-500° C.; and speed of the droplets through the drying zones in the droplet direction is typically 0.1-1000 cm/sec, more typically 50-500 cm/sec. When moving in the zone, the droplets are entrained in hot air or in an inert gas or a reactive gas. Residence time in the zone is instantaneous to a fraction of a minute, typically 0.1-10 seconds.

FIG. 2 illustrates a preferred spray drying system 210 composed of a pair of 5-foot long silica tubes of ⅛ of an inch in wall thickness joined end to end to form a continuous vertically disposed conduit about 10 feet long. The spinel dispersion is taken to an atomizer and introduced into the drying system through the top. Three heat or drying zones 212, 214, 216, are arranged around the conduit. The first heating zone 212 is disposed around the upper portion of the conduit but about ¾ of a foot below the top of the conduit where it maintains a temperature of 150° C. within the conduit; the second heating zone 214 is disposed around the lower portion of the conduit and spaced 5 feet below the bottom of the first heating zone where it maintains a temperature of 350° C. within the conduit; and the third heating zone 216 is disposed around the bottom portion of the conduit and spaced half a foot below the bottom portion of the second heating zone where it maintains a temperature of 430° C. Below the third heating zone 216 is a 2-foot long section 218 that is a continuation of the conduit and below section 218 is a half-foot long conical section 220 which terminates in an opening 2 inches in diameter. If temperature in the sections is not sufficiently high, LiF sintering aid will remain wet and the droplets will stick together, however, if the droplets are dried too fast, the deposited LiF will spall off the spinel droplets. If the given temperature profile disclosed herein is adhered to, satisfactory drying in a reasonable time is attained.

Below conical section 220 is cyclone separator 222 wherein the coated particles (dried droplets) are separated from the gas stream and left in collection bin 224. Suction hose 226 transports the gaseous components to exhaust. Coated particles from the collection bin are taken to densification.

The spray-dried coated particles, which can contain at least one spinel particle, are hot-pressed in an inert atmosphere at about 1550° C. and 5000 psi for about 2 hours to obtain a transparent monolithic sintered spinel product of less than 0.2% porosity. When in the hot press, minimal pressure of about 50 psi is initially applied until the coated spinel powder starts to densify at about 1100° C. and thereafter, pressure is raised to about 5000 psi when a temperature of about 1450° C. is reached. In a preferred embodiment, the heating schedule in this densifying procedure, which is conducted under initial vacuum of about $10^{-4}$ Torr, includes about a 20° C./minute ramp from ambient temperature to 950° C., about a half hour hold to allow the sintering aid LiF to melt and clean/etch the spinel particle surfaces, another 20° C./minute ramp to 1200° C., another half hour hold to allow vaporized sintering aid to leave the hot press, still another 20° C./minute ramp to about 1550° C., a 2-hour hold to fully density the spinel powder into a transparent shape, and turning off the heating elements and the hydraulic pump to allow pressure to bleed-off and temperature of the product in the hot press to cool to about room temperature under a vacuum of less than $10^{-3}$ Torr. Melting point of LiF is 850° C. and its boiling is about 2000° C. but starts vaporizing above its melting point. The heating and pressure schedule can be modified to accommodate other sintering aids.

In densifying the coated particles, it is important to keep in mind the necessity of removing the sintering aid, such as LiF, at the lowest possible temperature below about 1000° C. to a level below about 500 ppm lithium from the sintering aid LiF, more typically below about 100 ppm lithium, and below about 50 ppm fluorine from the sintering aid LiF, more typically below about 10 ppm fluorine, hereafter, referred to as essentially devoid of the sintering aid components, in this case lithium and fluorine. It is necessary to abide by these limits since at higher temperatures, reaction between the sintering aid and spinel is made more likely with the imminent production of impurities, such as lithium aluminate, lithium aluminum oxyfluoride and lithium aluminum fluoride which may negatively affect properties, such as the optical and mechanical properties.

Although the HIP procedure is typically omitted in this novel and unobvious process, and thus the cost of resulting product is reduced by ⅓ to ½, it may be desirable to subject the product of this invention to the HIP procedure of short duration to positively alter transparency, porosity or some other parameter(s) of the product. The HIP procedure for a sintering aid, like LiF, is carried out in an inert atmosphere at temperature above 1500° C., such as about 1750° C., and at a pressure above 20,000 psi, such as about 30,000 psi, to obtain a transparent product of porosity on the order of less than 0.2%. Duration of the HIP procedure in the past has been 1 day, however, with the process of this invention, HIP duration may be as short as about 1 hour and is typically 1-4 hours, when used. Generally, density of spinel products should be greater than 99.5% to have transparency since such products with density of less than about 99.5% are milky white and opaque.

The novel process disclosed herein is unobvious since it yields a transparent product after hot pressing in absence of the HIP procedure; reduces hot pressing conditions, provides for better reproducibility; increases yield; provides for smaller average grain size; reduces porosity; and minimizes exaggerated grain growth. Generally, the smaller and the more uniform grain size, the better the optical properties, up to a point. Once the particles become too small, such smaller than about 0.05 μm, strength, and possibly other parameters are negatively impacted.

FIG. 3 is a graph which shows variation of transmission at different wavelengths of light with the manner of preparing sintered and densified spinel experimental disks which were 1" in diameter and 1 mm in thickness. The disks were polished, first with SiC and then with diamond before use. The curves in FIG. 3 are identified as #1, #2, #3 and #4. Curve #1 was made by testing disks prepared by mechanical mixing 0.5% by weight of the sintering aid LiF with spinel particles, and is not representative of the invention herein: curve #2 was made by testing disks prepared by spraying 0.5% by weight of the sintering aid LiF pursuant to the invention herein; curve

Figure 3:
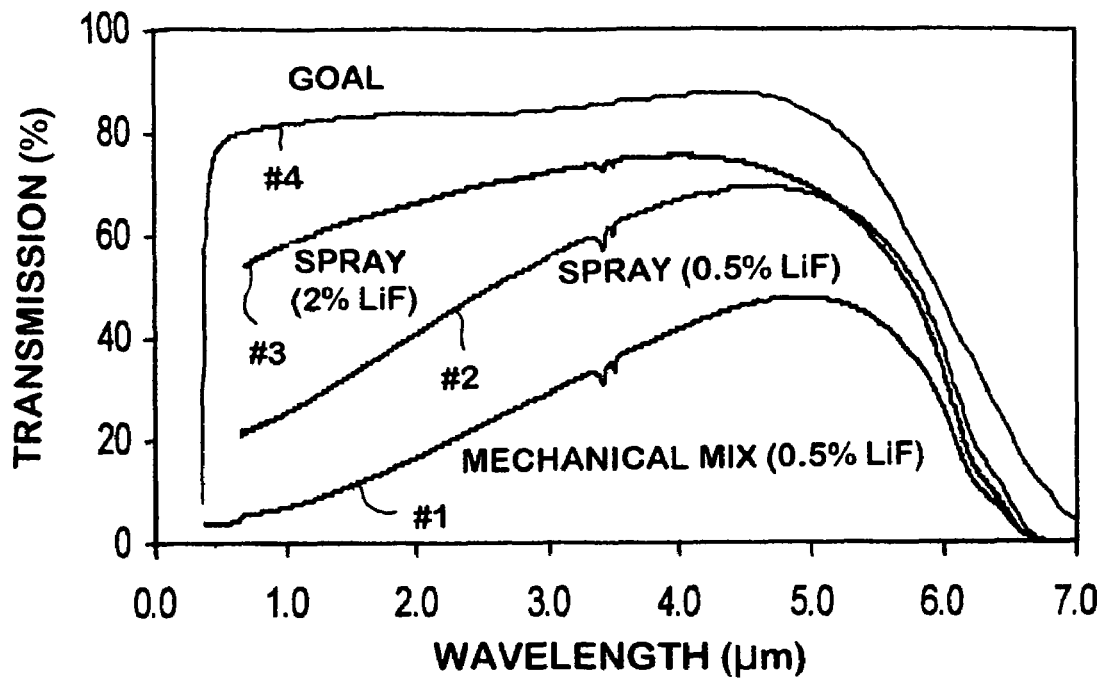
FIG. 3 is a graph of percent (%) Transmission versus Wavelength of densified spinel products wherein the curve marked #1, representing prior art, is mechanically mixed spinel particles with 0.5% by weight LiF sintering aid as opposed to spray-dried spinel particles with 0.5% by weight (curve #2) and 2.0% (curve #3) LiF sintering aid, which represent the invention herein. Curve #4 represents theoretical transmission.
Figure 4:
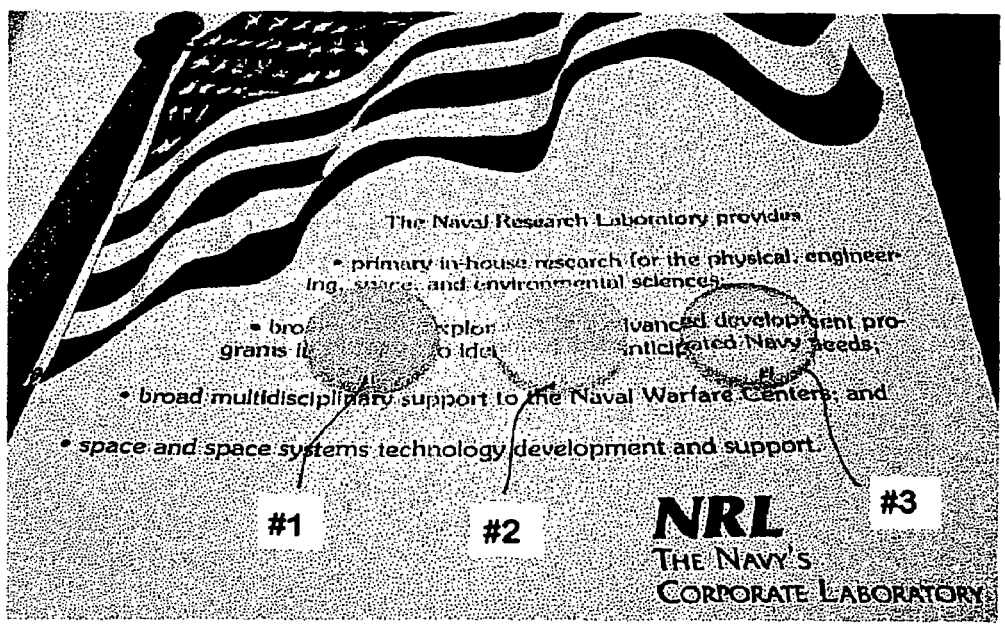
FIG. 4 is a representation of three discs made from coated spinel particles and correspond to curves #1, #2 and #3 in FIG. 3 showing pictorially opaque disc #1, which represents prior art, and transparent discs #2 and #3, which represent this invention.

3 was made by testing disks prepared by spraying 2% by weight of the sintering aid LiF pursuant to the invention herein; and curve #4 represents theoretical or a solid monolith of spinel $MgAl_2O_4$ where porosity was essentially zero. Data for the theoretical curve #4 was obtained from literature. Spinel powder particles that were used to prepare disks #1, #2 and #3 correspond to curves #1, #2 and #3 of FIG. 3, were in the range of 500 nm-10 µm. In preparing disk #1, the spinel particles and the particulate LiF sintering aid were mixed in a mortar and pestle for about 5 minutes whereas for disks #2 and #3, a sintering aid (LiF) solution was prepared, as described above, and used to spray-dry a LiF coating on the spinel particles. For disks #1, #2 and #3, densification in a hot press was carried out at initial vacuum of 110 Torr pursuant to the following schedule: 20° C./minute ramp from ambient to 950° C.; 30-minute hold period; another 20° C./minute ramp from 950° C. to 1200° C.; another 30-minute hold period; another 20° C./minute ramp from 1200° C. to 1550° C.; 2-hour hold period; and an extended cool down and pressure bleed-off period. Transparency or opacity of the disks corresponding to the curves #1, #2 and #3 is illustrated in FIG. 4 where disk #1 is shown as being opaque, disk #2 is shown as being partially transparent, and disk #3 is shown as being transparent. From FIG. 3, it is apparent that in the visible region of 0.4-0.7 µm, only disk #3 reaches transparency in the area of about 55%. It should be noted that, based on the data for curve #4 in FIG. 3, transmission drops from about 80% to about nil at a wavelength of about 0.3 µm.

The coating thickness on the particles can be varied, inter alia, by adjusting dilutions of the coating solution and/or by adjusting frequency of the atomizer; if an ultrasonic atomizer is used. For purposes herein, it has been found that coating thickness in the range of 1-1000 nm, more typically 2-200 nm is suitable. Uniformity of coating thickness was confirmed by scanning electron microscopy.

FIG. 5 shows superior properties of the magnesium aluminum spinel product compared to glass.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example details the use of lithium fluoride (LiF) sintering aid as a coating on magnesium aluminate ($MgAl_2O_4$) spinel particles. The use of LiF coating allows the hot pressing of the coated spinel particles in an inert atmosphere into a sintered transparent shape that has 70% transmission, as is detailed in Ex. 2.

The sintering aid in this example was 0.2 grams of LiF powder with a particle size in the range of 500 nm-10 µm. The LiF was initially dissolved in 220 ml of deionized water by mixing for about a quarter of one hour followed by addition of 780 ml of ethanol with mixing for about another quarter of one hour.

Figure 2:
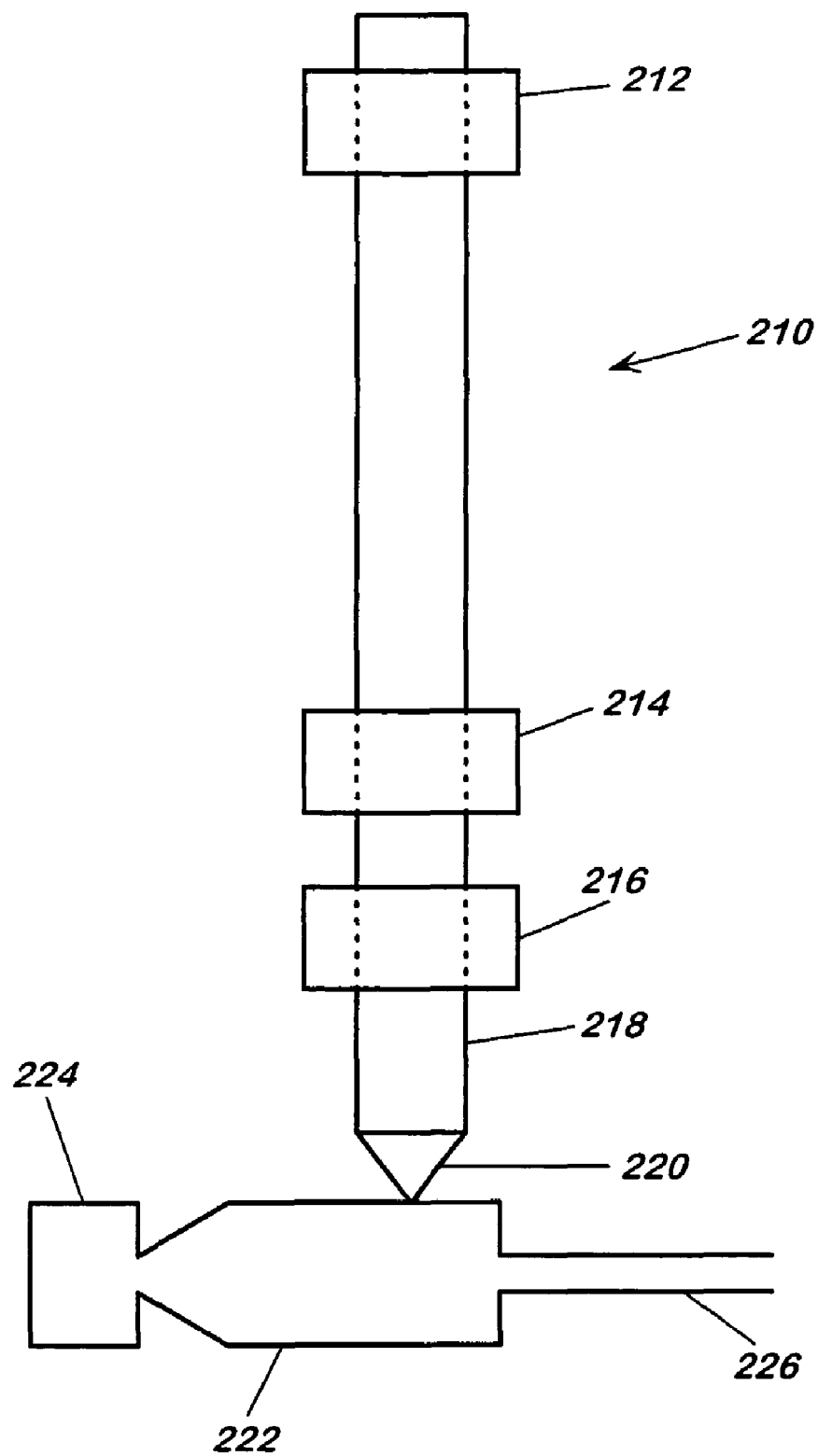
FIG. 2 is a schematic illustration of a preferred spray-drying system.

Ten grams of the spinel powder was mixed with the LiF sintering aid solution to form a dispersion that was delivered to an ultrasonic atomizer at a rate of 30 ml/minute using a metering pump and sprayed. The LiF sintering aid solution was at a neutral pH of about 7 which prevented LiF dissolved in the solution from precipitating on the spinel particles in the dispersion. The atomizer was operated at a frequency of 40 kHz and produced a fine stream of 45-micron droplets, containing 1-3 spinel particles, that were passed through a drying system illustrated in FIG. 2 at a rate of about 9 cm/second before being collected in a cyclone separator to form dried coated particles.

The droplets from the atomizer were introduced into the dryer system where the first drying zone was 1 foot from the top and temperature therein was 150° C. The second drying zone was 4 feet from below the first and was also 1 foot in length, as were all the others, but its temperature was 350° C. The third drying zone was ½ foot below the second and its temperature was 430° C. Below the third drying zone, there was a 2-foot straight section followed by a three quarter of a foot conical section. The dried coated particles issuing from the conical section through a 2-inch opening were directed to a cyclone separator where the dried coated particles were separated and kept in a bin and the gaseous components were removed through the suction hose. The coated particles from the bin were later removed to be densified. The coated particles were characterized by X-ray diffraction, scanning electron microscopy, and x-ray fluorescence. The coated particles were characterized as containing spinel ($MgAl_2O_4$) particles with a LiF coating.

EXAMPLE 2

This example provides details as to densification of the dried coated spinel particles prepared in the manner described in Ex. 1, above. The product had transmission of 70% and was prepared in a manner that did not include the expensive HIP procedure.

The coated particles in powder form and prepared as described in Ex. 1, above, were placed in grafoil-lined graphite hot press die and the die was placed in an inert argon atmosphere (or a vacuum of $10^{-4}$ Torr). Minimal pressure was applied until the powder started to densify at about 1100° C. and pressure was stepped up to about 5000 psi when the temperature of about 1450° C. was attained. The heating schedule included a 20° C./minute ramp from ambient to 950° C., a 30-minute hold to allow LiF to melt and clean/etch the spinel particle surfaces, a 20° C./minute ramp from 950° C. to 1200° C., a 30-minute hold to allow vaporized LiF, and probably other components, to escape the hot press die, a 20° C./minute ramp to 1550° C., and a 2-hour hold to fully density the spinel powder into a transparent shape. The heating elements and the hydraulic pump were then turned off to allow natural cooling of the hot press and allow the pressure to bleed-off, which took about 3 hours.

While presently preferred embodiments have been shown of the novel and unobvious sintered spinel products and their preparation, persons skilled in this art will readily appreciate that various additional changes and modifications can be made without departing from the spirit of the invention as defined and differentiated by the following claims.

What is claimed is:

1. A process for preparing a transparent ceramic product comprising the steps of:
   (a) dissolving a sintering aid in a suitable solvent to form a sintering aid solution,
   (b) applying the sintering aid solution to ceramic particles to form a ceramic dispersion,
   (c) sub-dividing the ceramic dispersion to form droplets comprising at least one ceramic particle coated with the sintering aid solution,
   (d) drying the droplets to form dried coated particles comprising at least one ceramic particle coated with a dried layer of the sintering aid, and
   (e) densifying the dried coated particles to form a transparent ceramic product having uniform optical and mechanical properties and being devoid of grains larger than about 1 mm, wherein said ceramic particles are spinel MgAl$_2$O$_4$, and wherein said densifying step is accomplished in a hot press by ramping temperature from ambient to above 1500° C., wherein the spinel particles making the spinel dispersion have particle size in the range of 500 nm to 100 μm; wherein the solvent includes water and an additive selected from the group consisting of ethanol, isopropanol, and mixtures thereof; and the ratio of water to additive to sintering aid to spinel particles is about 220 ml, about 780 ml, 0.2 grams, and 10 grams, respectively.

2. The process of claim 1 wherein pH of the final sintering aid solution is about 7.

* * * * *

UNITED STATES PATENT AND TRADEMARK OFFICE
CERTIFICATE OF CORRECTION

PATENT NO. : 7,611,661 B1
APPLICATION NO. : 11/094543
DATED : November 3, 2009
INVENTOR(S) : Villalobos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Twelfth Day of October, 2010

David J. Kappos
*Director of the United States Patent and Trademark Office*